(12) United States Patent
Miller

(10) Patent No.: US 8,074,420 B2
(45) Date of Patent: Dec. 13, 2011

(54) METHOD OF FORMING JOINTS OF NON-CYLINDRICAL TUBING

(75) Inventor: Jerry Miller, Prince George (CA)

(73) Assignee: Quick Fab Products Ltd., Prince George, B.C. (CA)

( * ) Notice: Subject to any disclaimer, the term of this patent is extended or adjusted under 35 U.S.C. 154(b) by 929 days.

(21) Appl. No.: 11/837,294

(22) Filed: Aug. 10, 2007

(65) Prior Publication Data

US 2008/0022625 A1    Jan. 31, 2008

Related U.S. Application Data

(63) Continuation-in-part of application No. 10/843,333, filed on May 12, 2004, now abandoned.

(51) Int. Cl.
E04B 1/18    (2006.01)
(52) U.S. Cl. .................. 52/633; 52/653.2; 52/656.1
(58) Field of Classification Search .............. 52/653.2, 52/843, 184, 653.1, 656.1; 285/179, 65
See application file for complete search history.

(56) References Cited

U.S. PATENT DOCUMENTS

| | | | |
|---|---|---|---|
| 396,013 A | 1/1889 | Thomson | |
| 1,574,563 A * | 2/1926 | Duff | 52/843 |
| 1,881,979 A | 10/1932 | Hall | |
| 2,930,638 A | 3/1960 | Morrissey | |
| 3,063,113 A | 11/1962 | Operhall, et at. | |
| 3,192,580 A | 7/1965 | Lubalin | |
| 3,401,737 A | 9/1968 | Rosenfeld | |
| 3,544,110 A | 12/1970 | Dickinson | |
| 3,966,337 A | 6/1976 | Crawford | |
| 4,093,017 A | 6/1978 | Miller, Jr. et al. | |
| 4,314,861 A | 2/1982 | Murakami et al. | |
| 4,322,176 A | 3/1982 | Johnson, Jr. | |
| 4,583,581 A | 4/1986 | Ferguson et al. | |
| 4,667,935 A | 5/1987 | Moore | |
| 4,940,072 A | 7/1990 | Pellman et al. | |
| D342,328 S | 12/1993 | Granstrom | |
| 5,280,955 A | 1/1994 | Nelson et al. | |
| 5,441,241 A | 8/1995 | McKim | |
| 5,617,694 A | 4/1997 | Baba | |
| 5,630,622 A | 5/1997 | Kirschenmann et al. | |
| 5,660,013 A | 8/1997 | Saldarelli et al. | |
| 5,788,452 A | 8/1998 | Brouwer et al. | |
| 5,820,289 A | 10/1998 | Kern et al. | |
| 6,123,378 A | 9/2000 | Teply et al. | |
| 6,164,706 A | 12/2000 | Hayes, Jr. | |
| 6,279,879 B1 | 8/2001 | Statz | |

FOREIGN PATENT DOCUMENTS

CA        2142637        8/1995

* cited by examiner

*Primary Examiner* — Basil Katcheves
(74) *Attorney, Agent, or Firm* — Denis R. O'Brien

(57) ABSTRACT

Structures built from square metal tubing and methods for their construction, wherein curved sections of square tubing are welded to substantially straight sections of metal tubing according to the design requirements of the structures. The curved components are stronger and lighter than equivalent components made by bending. In addition, the curved components can be manufactured in a much wider range of configurations, sizes and dimensions than equivalent components made by bending.

17 Claims, 17 Drawing Sheets

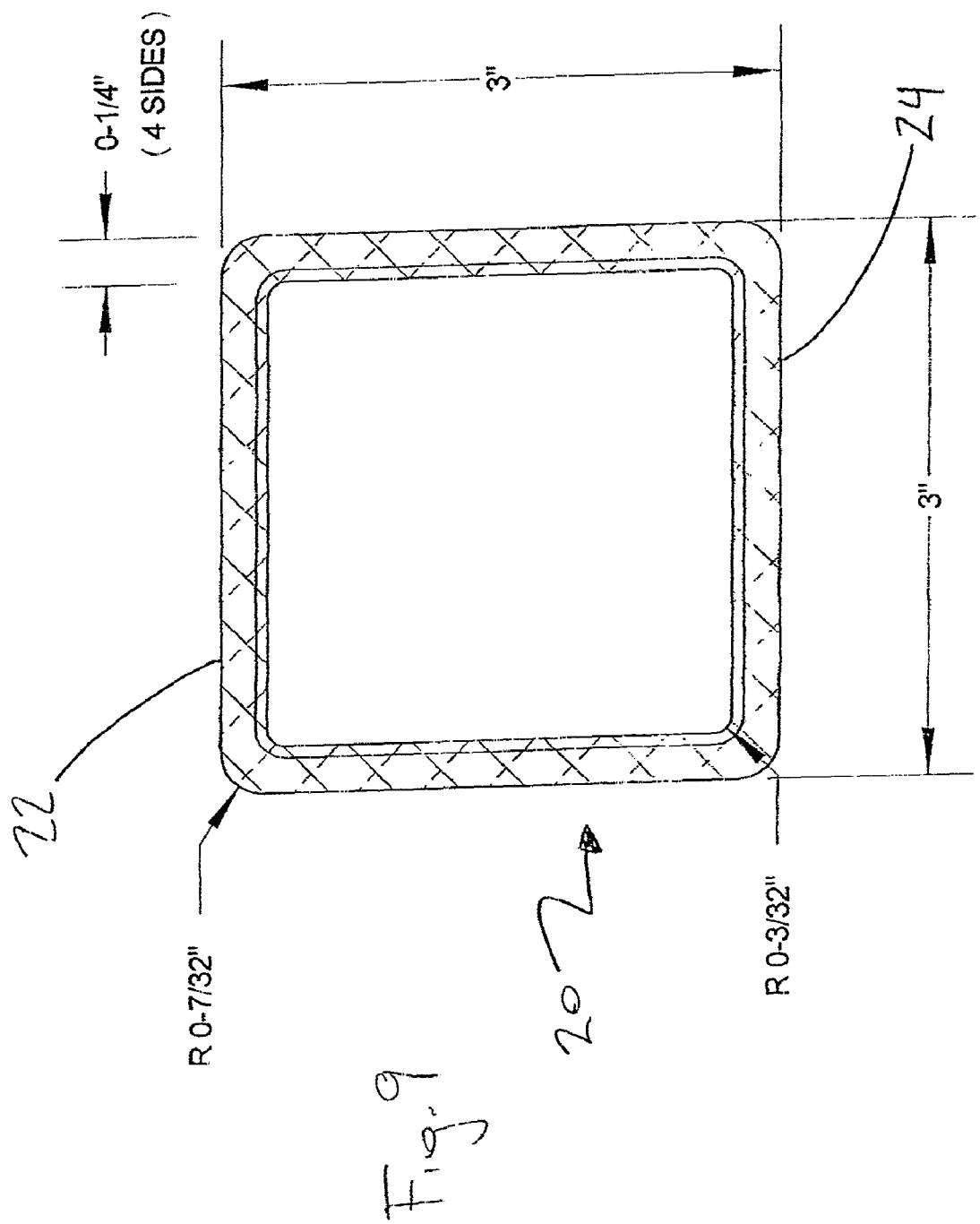

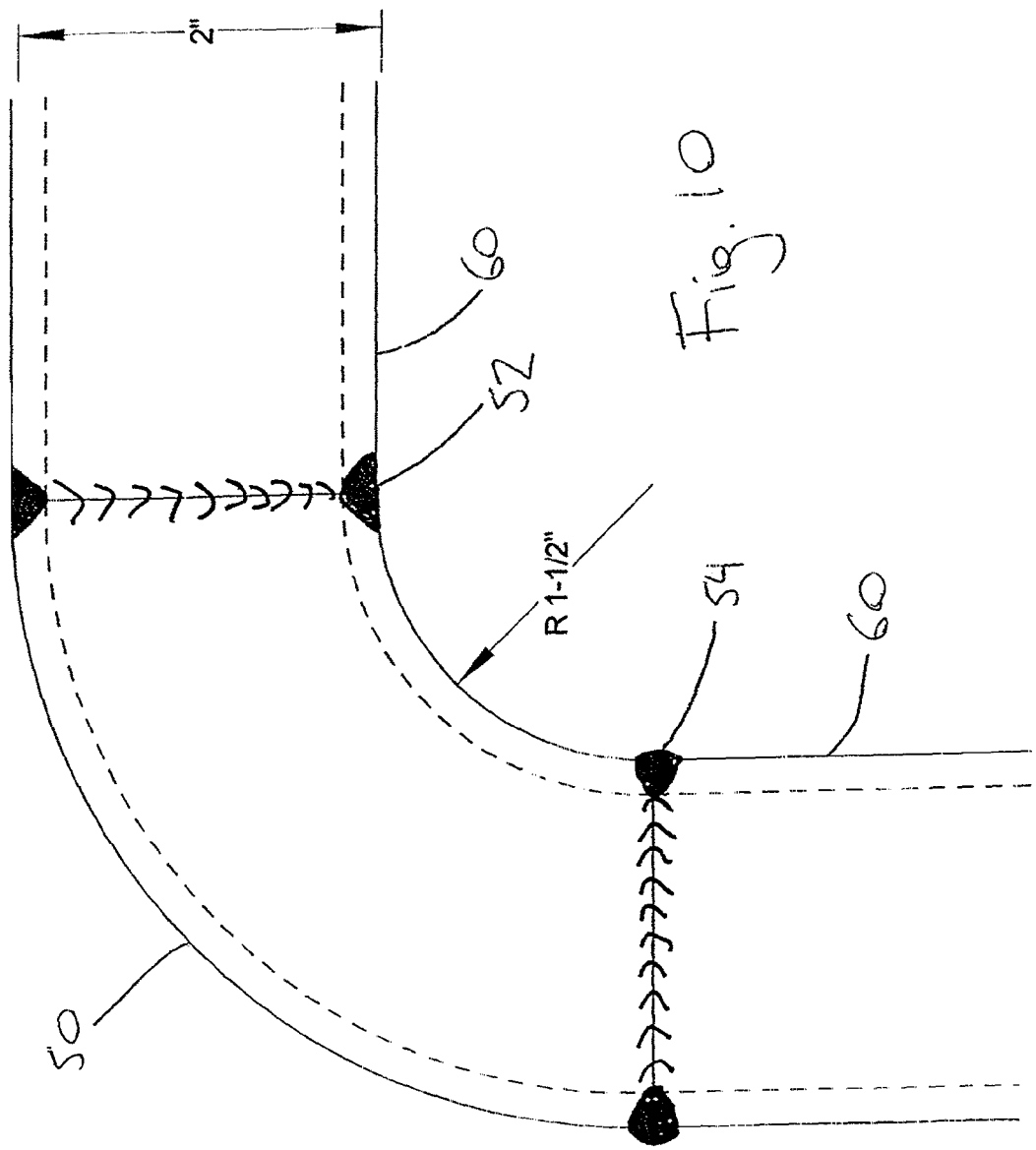

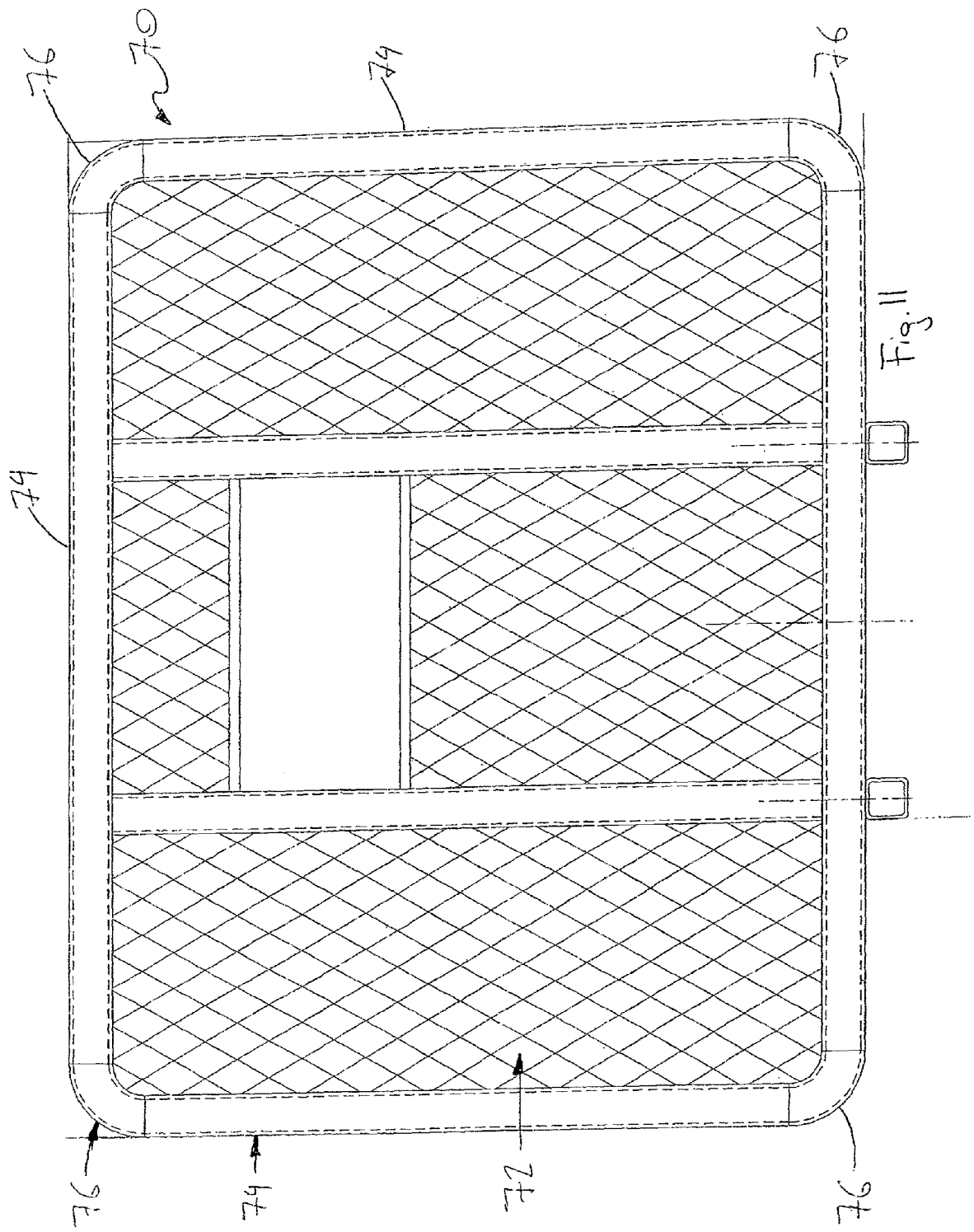

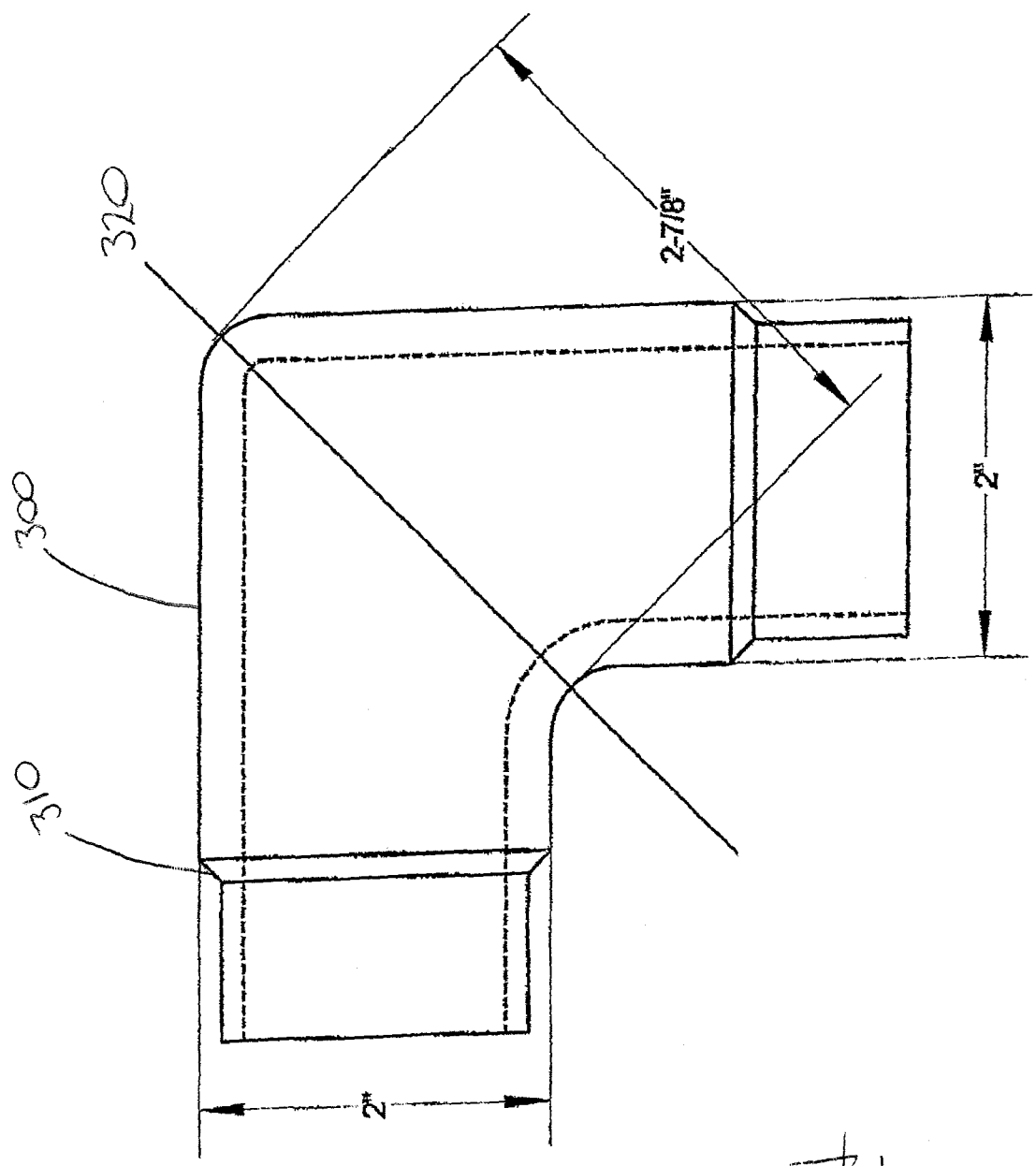

METHOD OF FORMING JOINTS OF NON-CYLINDRICAL TUBING

RELATED APPLICATIONS

This application is a Continuation in Part of U.S. application Ser. No. 10/843,333, filed May 12, 2004, now abandoned.

FIELD OF THE INVENTION

This invention relates to structures made of metal tubing and methods for their construction.

BACKGROUND OF THE INVENTION

Square metal tubing is used in a wide variety of applications. It is used, for example, in the construction of rollover and falling object protection systems (ROPS and FOPS, respectively) on heavy machinery, such as forklifts. Metal tubing is also widely used in all manner of railings, fences, brush-guards, building construction, etc.

Such applications often require corners or angled joints to be made between substantially straight sections of tubing. This is commonly accomplished in the prior art, for example, by welding together the ends of two straight metal tubes, or by bending the tubing to achieve the desired angle or curve (see, for example, FIGS. 1-5). However, both of these approaches suffer from several drawbacks.

The first drawback is that welding together two straight sections of tube results in a corner, which may not be aesthetically acceptable if a rounded look is desired. In addition, sharp corners present a hazard in that they are sharp points on which people and objects may get caught.

A drawback of bending square tubing to achieve the desired curve is that the minimum radius of the bend is limited. Short radius bends or elbows cannot be achieved by bending metal tubing because the side that forms the outer curve of the tube is stretched and weakened and may even be broken. In addition, the side that forms the inner curve of the tube is wrinkled or deformed such that its appearance and structural strength are compromised. Accordingly, only relatively large radius curves can be achieved by bending.

Furthermore, for FOPS and ROPS type applications, where the strength of the finished rectangular tube structure is crucial, weak joints are unacceptable. In some cases the weakness of bent joints and elbows can be compensated for by using thicker metal, however, this is in exchange for greater cost, labour and material. In addition, thicker metal results in a heavier structure, which may not be desirable. It appears, from commercially available bent tubing products, that the minimum radius that can be achieved by bending square steel tubing is approximately 2.5 times the width of the tubing (width being measured in a plane parallel to the radius of curvature). This limit will obviously vary with tube size, tube wall thickness, and bending techniques, etc.

In addition, bending is simply not practical for larger sized metal tubing. For example, 12"×12" square steel tubing can hardly be bent at all (let alone to a curve having a radius of 30" (2.5 times the width of the tubing)) simply because the tube will suffer excessive stretching and compression on the outer and inner faces of the curve, respectively.

In order to withstand the stretching caused by bending, metal tubes having a certain minimum thickness must be used. If the metal used is too thin, for a bend of given radius, it will break or be weakened to the point where it becomes structurally useless. In essence, the sharper the bend and/or the larger the width of the metal tube, the thicker the metal that must be used. Therefore for many applications, such as hand railings, a thinner metal could be used but for the requirement that it withstand the stress of bending.

Attempts have been made to address some of these needs in the prior art. For example, U.S. Pat. No. 5,441,241, issued to McKim, discloses a Knuckle for Welding of Safety Hand Railings. However, the knuckle disclosed by McKim being a solid piece of metal is inappropriate for use with large diameter rectangular tubing because it would be extremely heavy. In addition, McKim's knuckle results in a sharp inside angle or corner in which, in the case of handrails, clothing or even user's hands can be caught. Finally, the angle of McKim's knuckle cannot be modified, for example, on a job site during construction (i.e. each knuckle is manufactured for a specific angle and is not readily modified).

Several U.S. patents have issued for inventions relating to joints for structures, railings or fences, (for example, U.S. Pat. Nos. 4,667,935; 5,820,289; 2,930,638; 4,322,176; 5,617,694; 6,164,706; and 4,314,861) however, the systems disclosed by such patents generally suffer from one or more of the following disadvantages:

(a) they do not provide the requisite strength necessary for applications such as FOPS and ROPS;

(b) the angle of the joint or elbow cannot be readily adjusted or modified;

(c) they are not aesthetically pleasing;

(d) they are unnecessarily complex and/or expensive to produce; and (e) they are limited in the radius and degree of bend that can be achieved.

For example, Kirschenmann et al., (U.S. Pat. No. 5,630,622) disclose a welded metal structure incorporating right-angled cast corner elements.

The method disclosed by Kirschenmann et al. does not conform to the standards set by the American Welding Society, or AWS (and similar organizations in other jurisdictions, such as the Canadian Welding Bureau) and they are prone to cracking, which can lead to catastrophic failure of structures such as ROPS and FOPS. The weld joint of Kirschenmann et al. is a butt-weld or butt-joint between two tubular members. The AWS Structural Welding Code requires that transitions between two butt welded members having different thicknesses must have smooth transitions having a slope of no more than 1 in 2.5 (i.e. it must be sloped, chamfered and/or tapered). The welded joint disclosed by Kirschenmann et al. does not conform to the standard set in the AWS Structural Code. Therefore, before such a weld/joint can be used, a sample must be prepared and submitted for testing. If the weld/joint is approved, then it can be incorporated into the structure. This is obviously a severe drawback of the invention of Kirschenmann et al., which results in substantial delays and added expense.

Further, in Kirschenmann et al. the ends of the straight structural members are not welded to the ends of the corner members. Rather, a "transition portion" of the corner members is welded to the straight tubular members. The transition portion is not the end of the cast corner member because of gussets that extend well beyond it. The gussets of Kirschenmann et al. are prone to cracking in the area proximate the base of the gussets due to the stress caused by the adjacent weld, (e.g. lamellar tearing). Referring to FIG. 15, the area 200 proximate the weld 210 is susceptible to cracking due to the drastic change in thickness of the corner member 220 (identified by reference number 20 in Kirschenmann et al.) proximate the weld. Therefore, at best, the gussets of Kirschenmann et al., provide negligible reinforcement and, at worst, result in a compromised welded joint due to its susceptibility to cracking.

In addition, the invention of Kirschenmann et al, is not amenable to modification. In other words, once the corner member of Kirschenmann et al. is manufactured it cannot be modified easily in order to, for example, adjust its angle. Other prior art methods of welding tubular metal structures also suffer from this disadvantage. In effect, if one attempts to change the angle of a corner member by cutting any portion of the corner member, then the cross-section of the end of the corner member will have been necessarily changed as well. Therefore the corner member can no longer be welded to other members structural members without taking additional time- and material-consuming steps to adapt the cross-sectional shape of the corner member to that of the other structural members. By way of example, FIG. 12 shows a prior art corner member 300. FIG. 13 shows the cross-section 330 of corner member 300 at the ends 310 (generally equivalent to the corner members 20 of Kirschenmann et al.). The ends 310 have 2" diameters. Clearly, if either end 310 of corner member 300 is welded to another tubular structural member, the tubular structural member has to have a cross-section matching the ends 310. However, if the corner member 300 is modified by cutting it along a diagonal line, the cross section will change. The corner member can only then be welded to another structural tubular member having a similar cross-section. By way of example, FIG. 14 shows the cross section 340 of corner member 300 when it is cut along line 320. Referring to FIGS. 12-14, the cross-sections of FIGS. 13 and 14 differ substantially (i.e. the diameter increases by almost 50%, to 2⅞").

Accordingly, there exists a need in the art for elbows and joints for use with metal tubing that address these deficiencies.

SUMMARY OF THE INVENTION

The present invention relates to the construction of structures, such as handrails, fences, brush-guards, rollover protection systems and falling object protection systems, by welding together sections of substantially straight, square or rectangular metal tubing and sections of curved square or rectangular metal tubing. The curved sections of square tubing may be made by casting or other means, provided that they are not made by bending a metal tube. Such bending compromises the structural integrity of the resulting curved tube.

The curved sections of tubing are welded to one another or to substantially straight sections of metal tubing according to the design of the structure. The curved components are stronger and lighter than equivalent components made by bending. In addition, the curved components can be manufactured in a much wider range of configurations, sizes and dimensions (e.g. the curved components of the present invention can have a greater degree of curve and a much smaller radius of curve than bent components).

In the preferred embodiment adjacent sections of metal tubing are butt welded together.

Casting the curved components results in lower manufacturing costs when compared with the costs of producing equivalent components by bending.

Alternatively, the curved components can be made by stamping, cutting and/or rolling the various sides or faces of the curved components, which are then welded together along their edges.

BRIEF DESCRIPTION OF THE DRAWINGS

Further features and advantages of the invention will be apparent from the following detailed description, given by way of example, of specific embodiments taken in conjunction with the accompanying drawings, wherein:

FIG. 9 is a cross-sectional view through the elbow of FIG. 8;

FIG. 10 is a side view of 90-degree cast steel elbow shown butt-welded to adjacent sections of square tubing;

FIG. 11 is a plan view of a cab guard constructed according to the present invention;

FIG. 12 is a side view of a prior art right-angle corner;

DETAILED DESCRIPTION

When a metal tube is bent it is stressed and weakened. The act of bending a metal tube results in the stretching, wrinkling, narrowing and possibly cracking of portions of the tube. The amount and type of deformation depends on several factors, including the dimensions of the metal tubing, the type of metal used, the method used to bend the tubing, the angle or degree of the bend and the radius of the bend. The smaller the radius and the greater the degree of the bend the more the tube will be stressed and weakened. The most common manner of weakening are stretching, thinning and strain hardening of the outside wall of the bent tube (i.e. the wall that forms the outer curve of the bent tube). Due to such deformations, for any given type of metal tubing, there is a minimum radius that can be achieved by bending. When a tube is bent to too small a radius the outside wall of the tube can crack. Such cracking is more likely to occur if the weld seam of the metal tube is located near or along the outer curve of the bent tube. However, even before cracks appear, the metal tube may already have been weakened to the point where it is useless for its intended purpose.

In other words, in bending any given size or type of metal tubing the strength of the tubing is necessarily compromised. In addition, both the degree of bend and the minimum radius that can be achieved are limited.

As used herein, "square" tubing means elongated metal tubing having square or rectangular cross-section. Square tubing includes metal tubing having square or rectangular cross-section. Square tubing also includes tubing wherein the corners of the square or rectangular cross-section are rounded.

Figure 1:
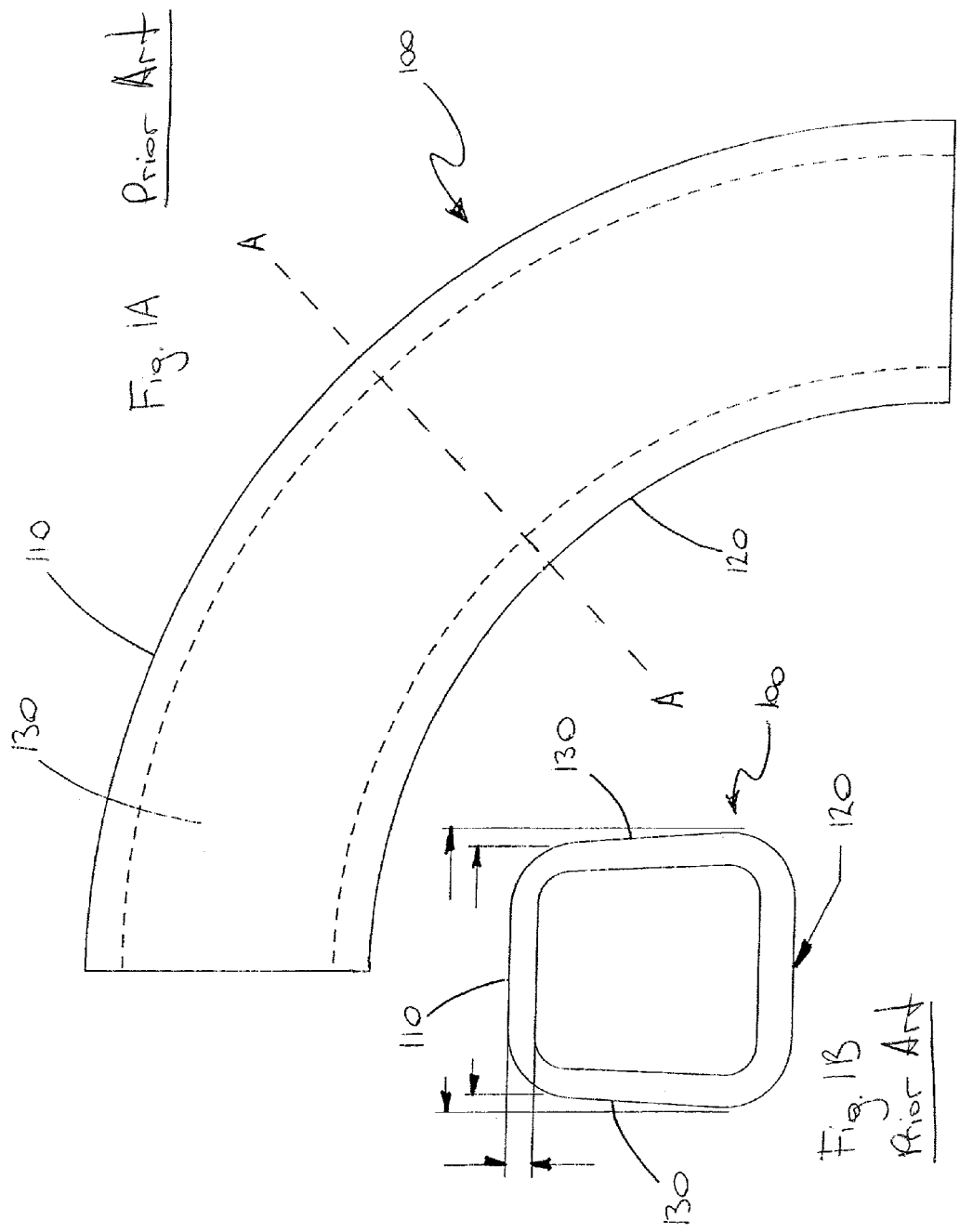
FIGS. 1A and 1B show side and cross-sectional views of prior art bent square tubing.

Referring to FIGS. 1A and 1B, a section of bent square tubing 100 is shown having an outer curved wall 110, an inner curved wall 120 and lateral walls 130 (FIG. 1B shows a cross-section of the square tubing of FIG. 1A taken along line A-A). Bending a linear metal tube to form the bent tubing 100 results in the thinning and narrowing of the outer curved wall 110 relative to the inner curved wall 120. In addition, the portions of the lateral walls 130 nearest the outer curved wall 110 experience thinning and deflection toward one another. The maximum deformation is experienced near the middle of the outer curved wall 110 (in an area near the point where the outer wall 110 is intersected by line A-A). Such deformation has the effect of weakening the tubing 100 and, therefore, any structure in which the tubing 100 is incorporated may be compromised. It may be possible to compensate for this weakening by using thicker metal, however, even if this is possible it will result in increased weight and cost.

Figure 2:
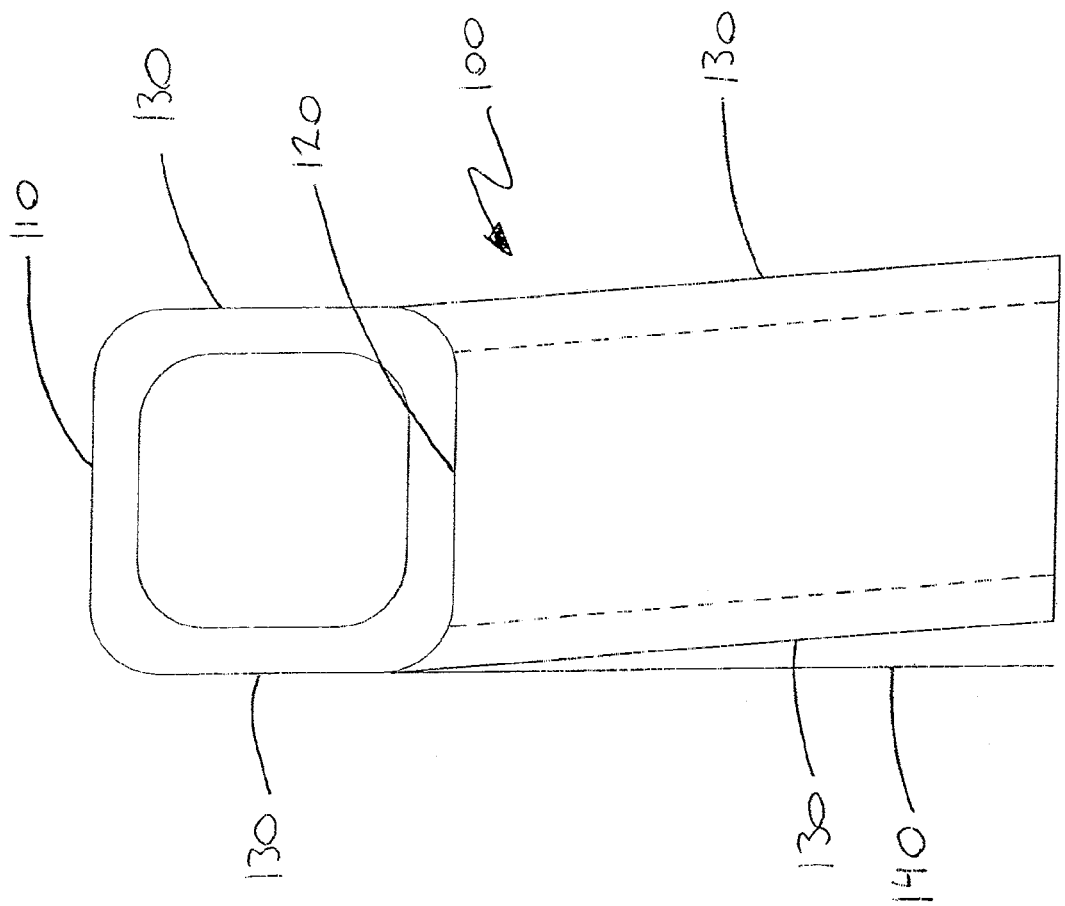
FIG. 2 is an end view of a section of prior art bent tubing.

Referring to FIG. 2, an end view of the bent section of metal tubing 100 is shown. The bending process often causes the metal tube to twist. This is shown in FIG. 2 by the deviation of the metal tube 100 from the reference line 140, which represents the position that would be occupied by the lateral wall 130 of an untwisted section of metal tubing.

Figure 3:
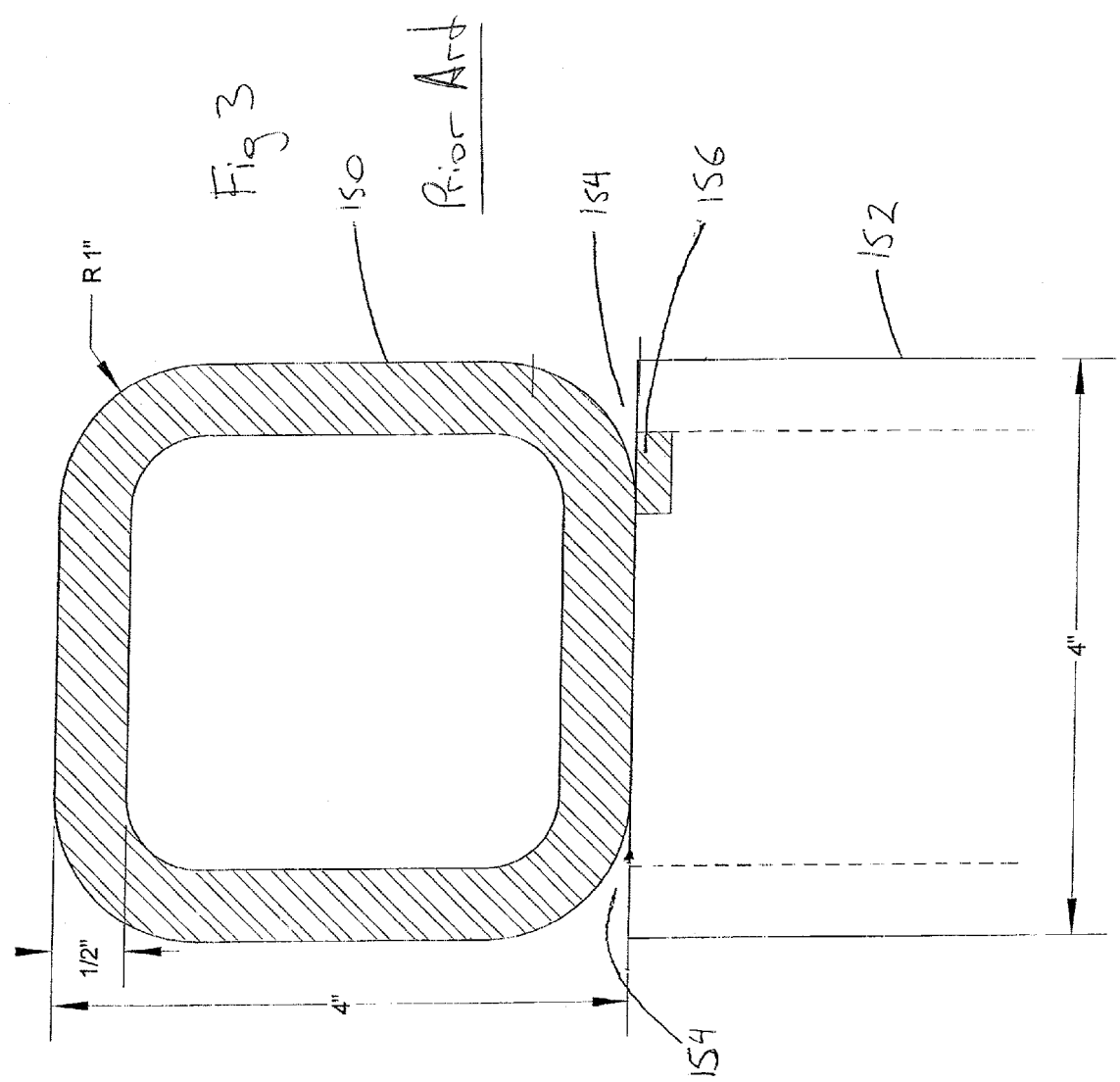
FIG. 3 is a side view of a prior art corner joint.
Figure 4:
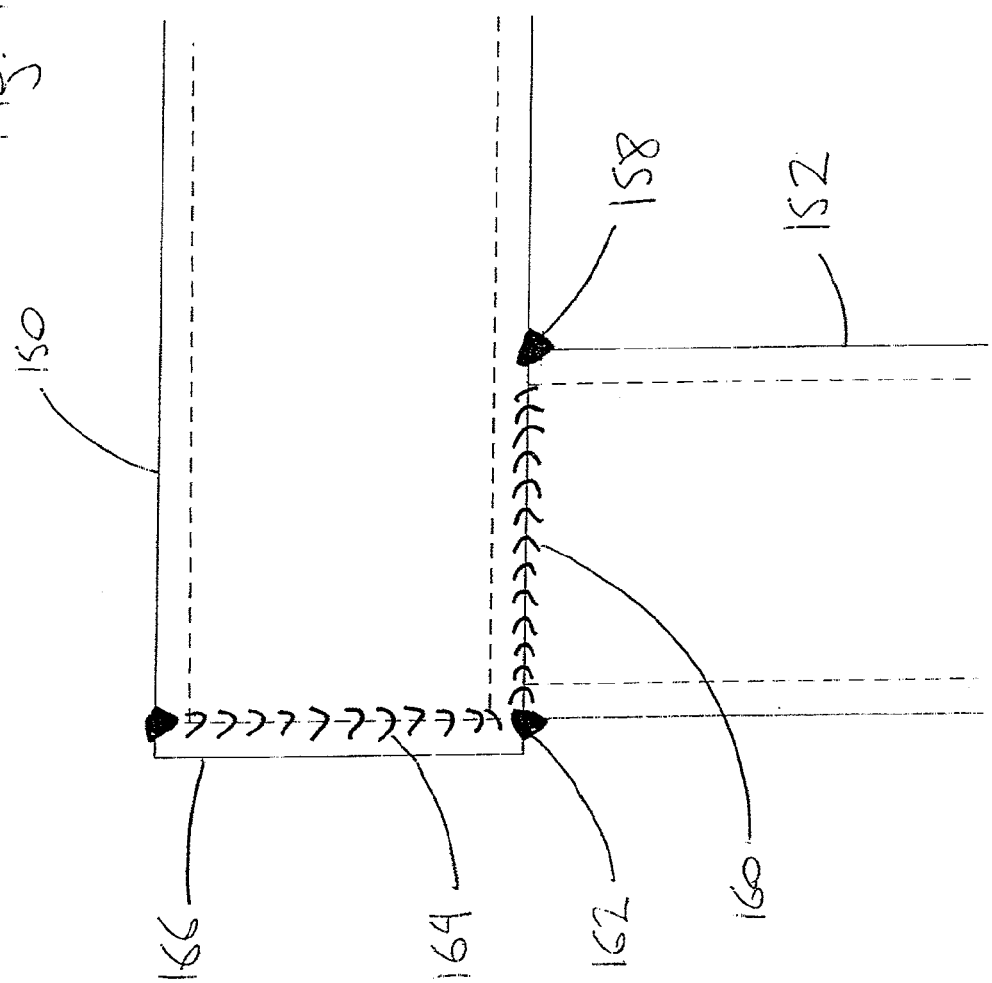
FIG. 4 is an end view of a prior art corner joint.

Referring to FIGS. 3 and 4, end and side views of a corner joint between two sections of 4"×4"×½" square metal tubing 150, 152 are shown. In FIG. 3 the joint is shown without welds and in FIG. 4 the joint is shown with welds 158, 160, 162, 164. FIGS. 3 and 4 demonstrate that, when making corner joints between relatively large corner radius square tubing, excessive weld is required to fill the space 154 between the tubes so that the weld is flush with the flat surfaces of the square tubing 150, 152. In addition, a backing bar 156 must often be employed to aid in welding the tubing together. As a result, such joints are time consuming to make and have inferior structural characteristics.

A difficulty encountered in such joints is that, due to the excessive welding, there is a substantial risk that lamellar tears will develop in the wall of the tubing proximate the weld. Lamellar tearing is the separation of the metal of the tube in a plane generally parallel to the rolling direction of the plate of the metal tube. The tearing develops in susceptible material as a result of high through-thickness strains. The through-thickness strains are the normal result of weld metal shrinkage. By definition, lamellar tears always lie within the base metal, (i.e. the metal tube) generally parallel to the weld fusion boundary. The tear may initiate just outside the visible heat affected zone and propagate to the root or toe, in which case the tear may be detected visually. Often, however, the tear is subsurface, in which case it must be detected by other means (e.g. ultrasonic testing).

The welding between the two tubes 150, 152, and in particular the inside corner weld 158, causes the free end of the upper tube 150 (i.e. the end not welded to the lower tube 152) to deflect downwards toward the lower tube 152. The end result is that after taking care to ensure that the joint is properly aligned and welding the two tubes together, one of the tubes may no longer be straight.

When making a T-joint or corner joint as shown in FIGS. 3 and 4 it is often necessary to weld a plate 166 onto the end of the upper tube. Such a plate 166 helps to reinforce the upper tube 150 against twisting that may occur when the structure is placed under stress. The welding of such a plate represents an additional step in the making of such a T or corner joint, which step is required in many jurisdictions by occupational safety regulations (for example, when such a joint is used in the construction of ROPS or FOPS). As will become clear from the discussion below, this extra step is unnecessary in structures constructed according to the present invention.

Figure 5:
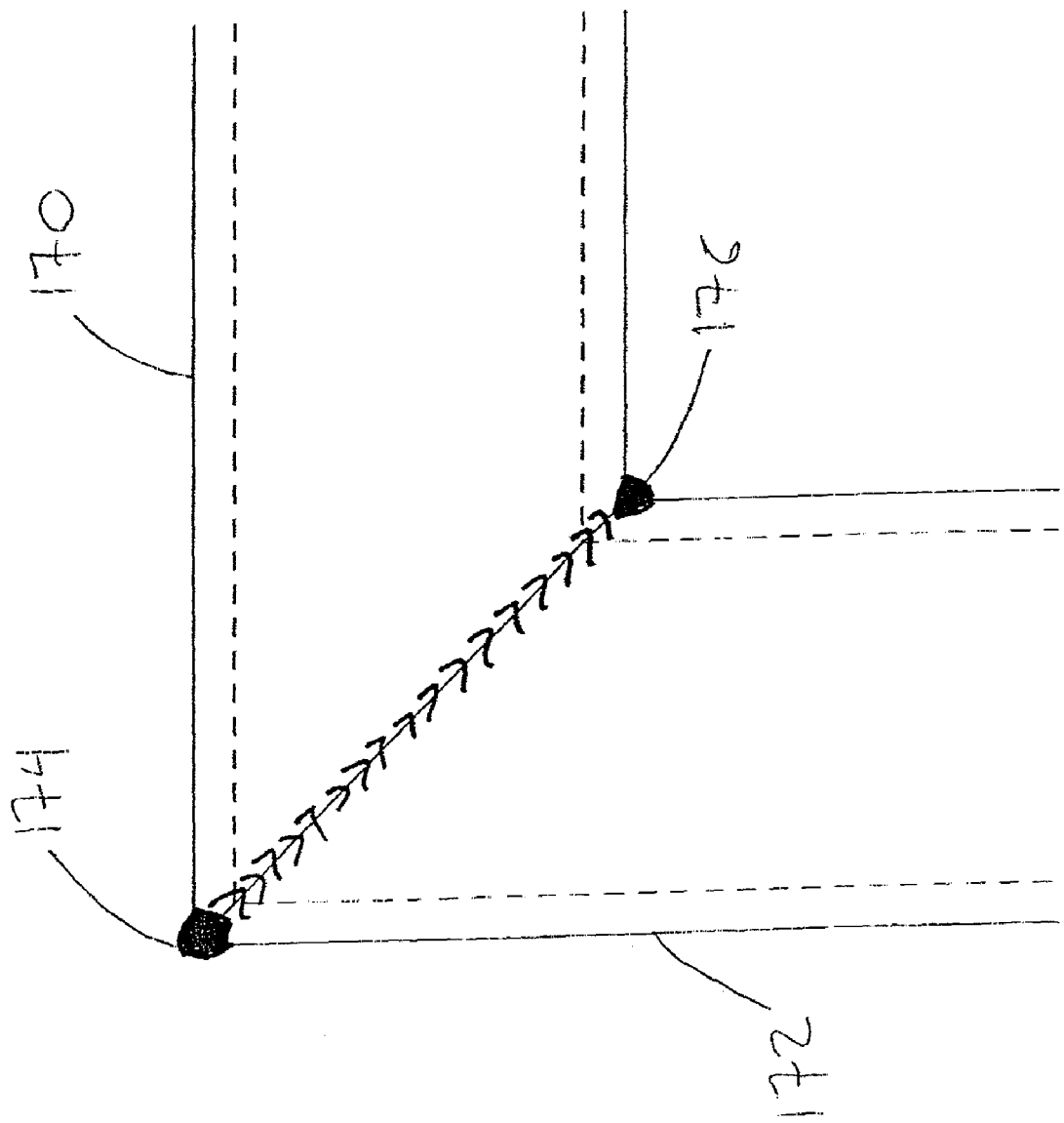
FIG. 5 is a side view of an alternate prior art corner joint.

Referring to FIG. 5, a miter joint is shown between two straight sections of square metal tubing 170, 172. The need for bending metal tubing can in some instances be avoided by such miter joints, however, such miter joints involve an extra cutting step, (the ends of the metal tubes must be cut on an angle) and have sharp inside and outside corners 174, 176, which represent potential hazards. In addition, miter joints may be aesthetically undesirable in certain applications.

Figure 6:
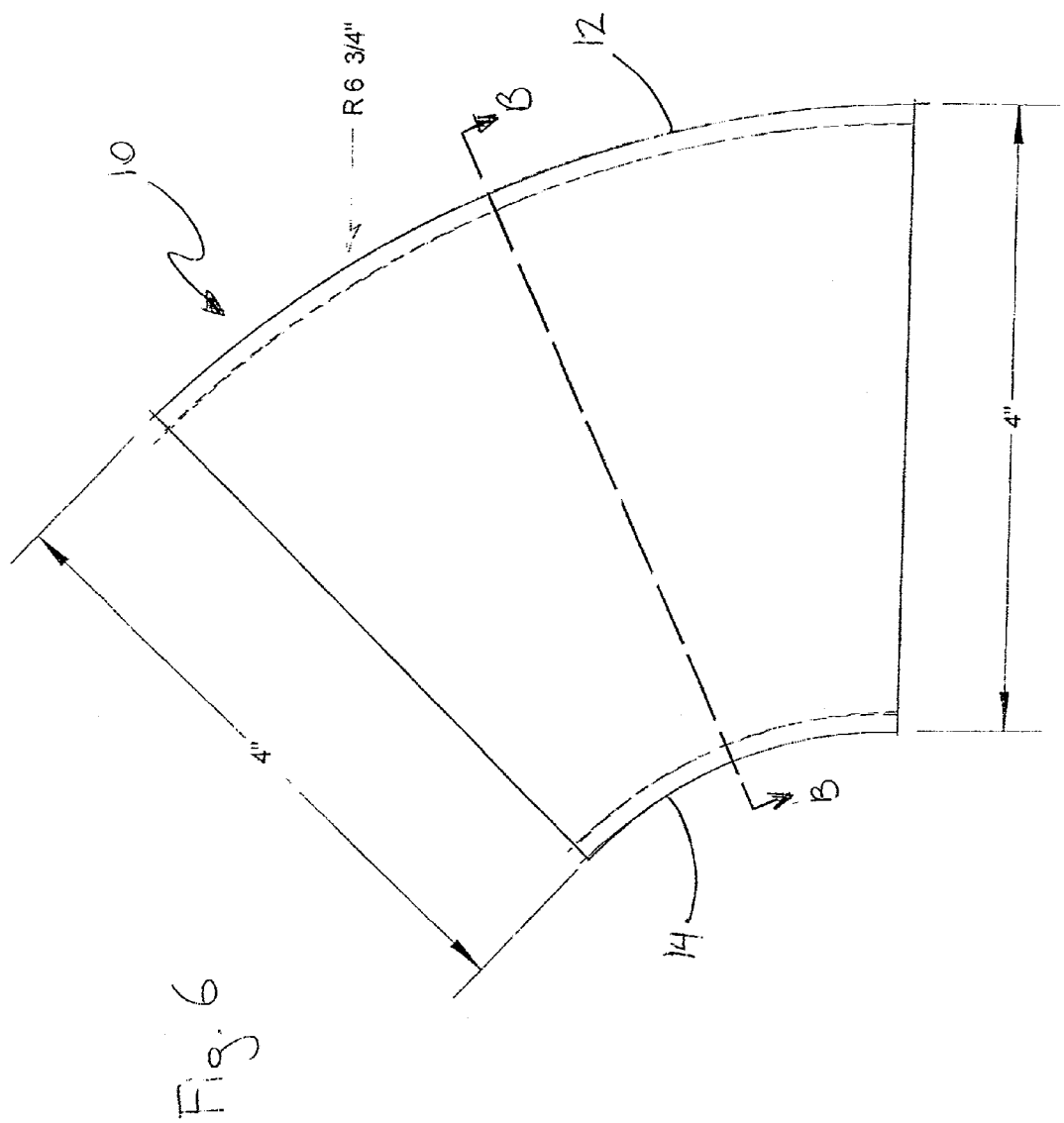
FIG. 6 is a side view of a 45-degree elbow according to the present invention.
Figure 7:
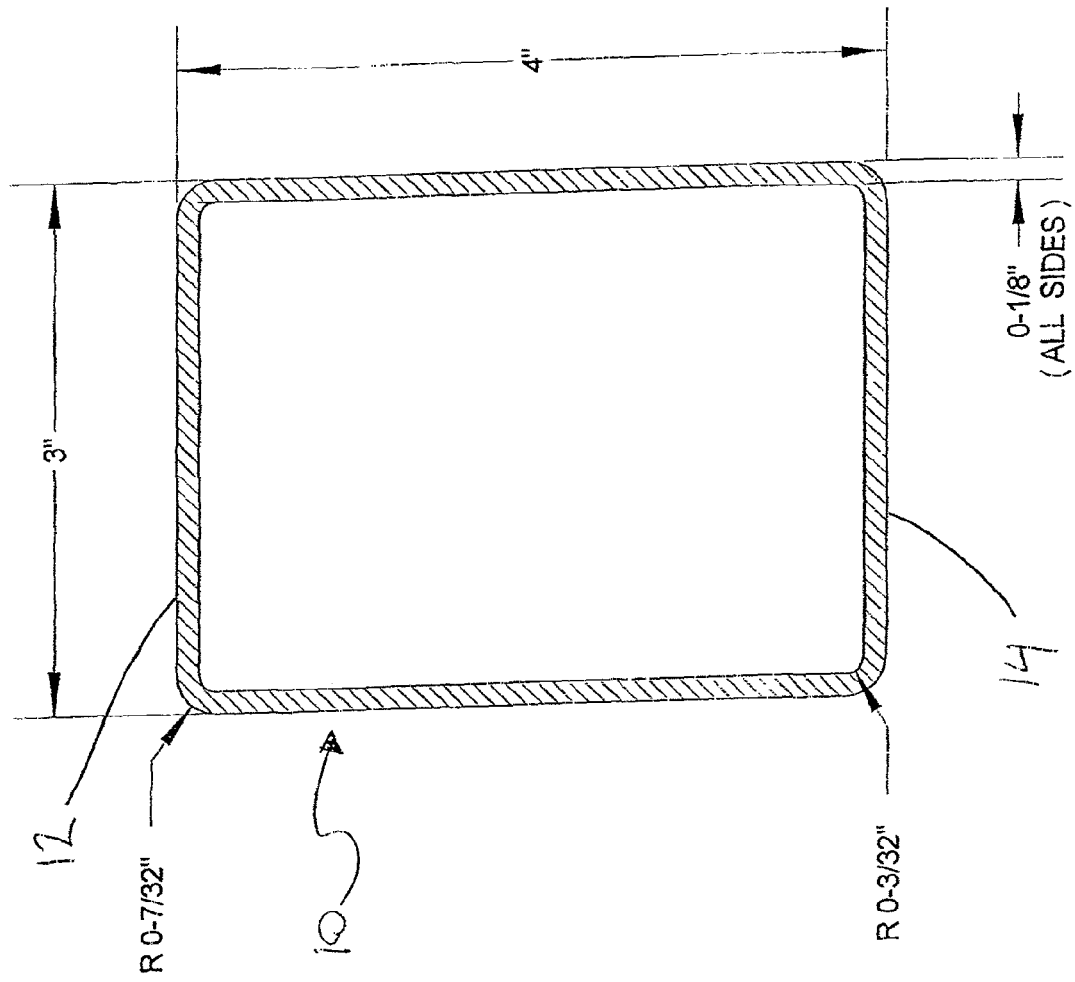
FIG. 7 is a cross-sectional view through the elbow of FIG. 6.

Referring to FIG. 6, a 45-degree elbow 10 of square metal tubing is shown having an outer curved side 12 and an inner curved side 14. Referring to FIG. 7, the 45-degree elbow 10 is shown in cross-section taken along line B-B of FIG. 6. The elbow 10 is a 4"×3" metal tube having a wall thickness of ⅛". The outer curved side 12 has a radius of curvature of 6¾" and a length of approximately 5.3" and the inner curved side 14 has a radius of curvature of 2¾" and a length of approximately 2.16"Due to the degree of the bend, the radius of the bend, and the wall thickness of the elbow 10, the 45-degree elbow cannot be made by bending a straight piece of metal tubing using known bending techniques and standard metals because the outer curved side 12 would be stretched to the point of cracking. The outer curved side 12 is almost 2.5 times as long as the inner curved side 14 and the radius of curvature of the inner curved side 14 is less than ¾ of the width of the elbow 10 (i.e. 4").

Figure 8:
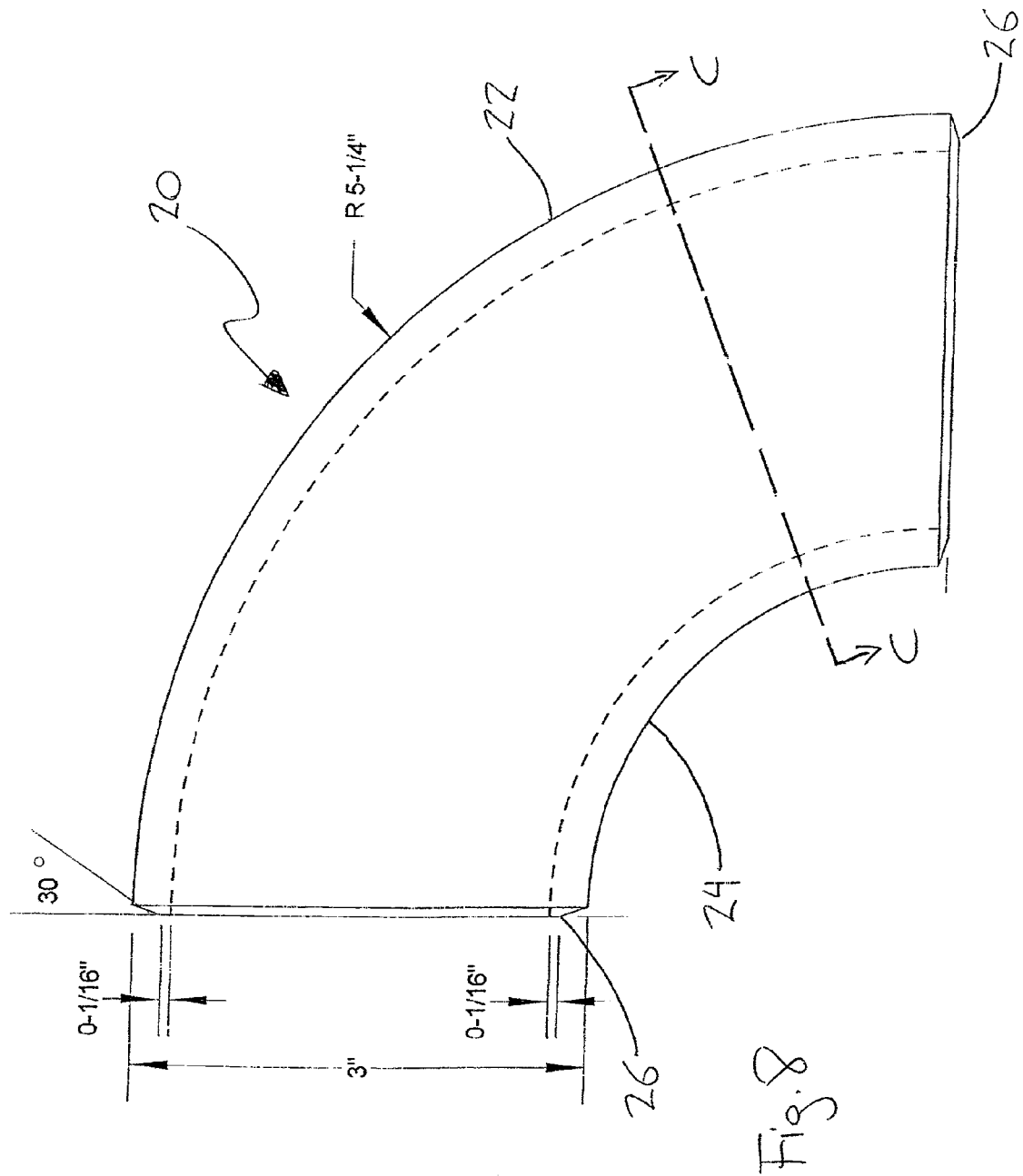
FIG. 8 is a side view of a 90-degree elbow according to the present invention.

Referring to FIG. 8, a 90-degree elbow 20 metal square tubing is shown having an outer curved side 22 and an inner curved side 24. Referring to FIG. 9, the 90-degree elbow 20 is shown in cross-section taken along line C-C of FIG. 8. The elbow 20 is a 3"×3" metal tube having a wall thickness of ¼". The outer curved side 22 has a radius of curvature of 5¼" and a length of approximately 8.2" and the inner curved side 24 has a radius of curvature of 2¼" and a length of approximately 3½". Due to the degree of the bend, the radius of the bend, and the wall thickness of the elbow 20, the 90-degree elbow cannot be made by bending using known bending techniques and standard metals because the outer curved side 22 would be stretched to the point of cracking. The outer curved side 22 is more than 2 times as long as the inner curved side 24 and the radius of curvature of the inner curved side 24 is less than ¾ of the width of the elbow 20 (i.e. 3").

Referring again to FIG. 8, the ends of the elbow 20 are beveled 26 such that they are ready for butt welding to the ends of adjacent sections of metal tubing.

As has been discussed above, the curved tubular elbows of the present invention can be manufactured by casting. Referring to FIGS. 16A, 16B, 17A and 17B, two additional methods of manufacturing the curved tubular members of the present invention are illustrated.

Figure 16B:
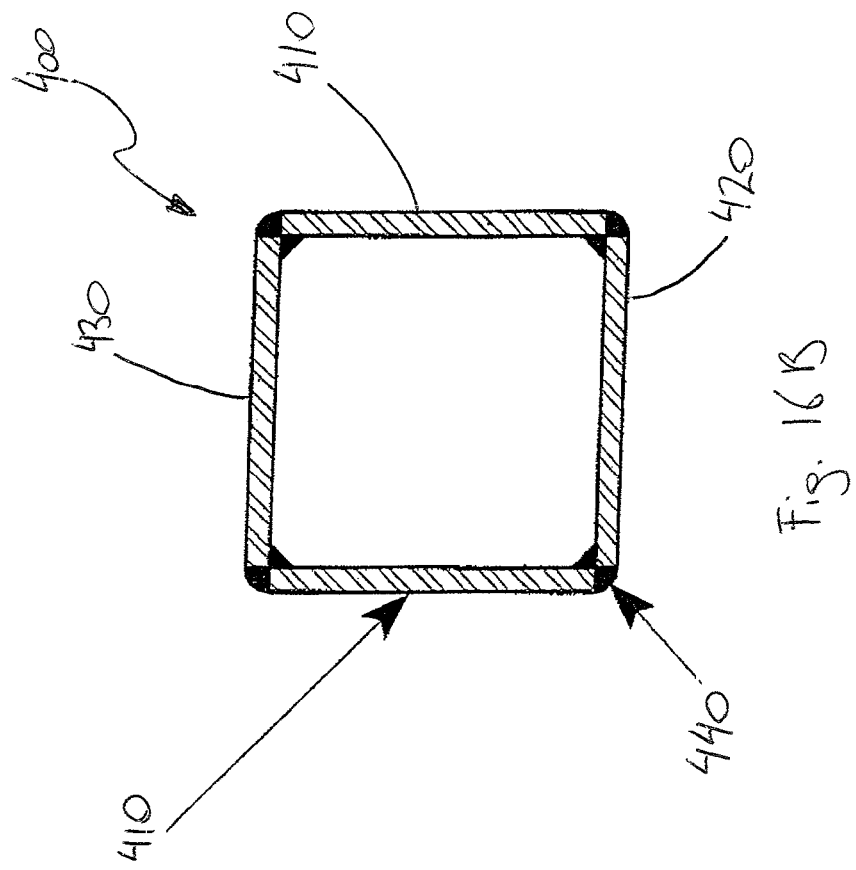
FIGS. 16A and 16B show side and cross-sectional views of a curved elbow of the present invention.
Figure 16A:
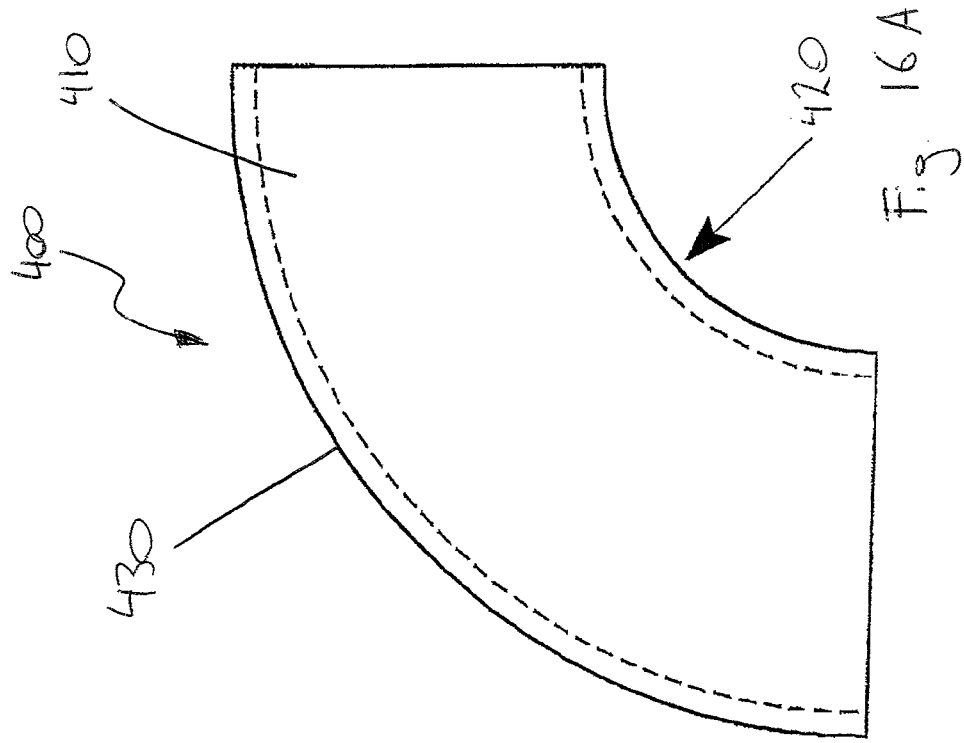

Referring to FIGS. 16A and 16B, the curved tubular member 400 has lateral sides 410, inner side 420 and outer side 430. The lateral sides 410 can be stamped or cut from flat metal plates. The inner sides 420 and the outer sides 430 can be cut or stamped to provide the desired shape, and rolled to provide the desired curvature. The edges 440 of the sides 410, 420, 430 are then welded together to form the curved tubular member 400. The edges 440 are preferably welded along both the inside and outside of the curved tubular member 400.

Figure 17B:
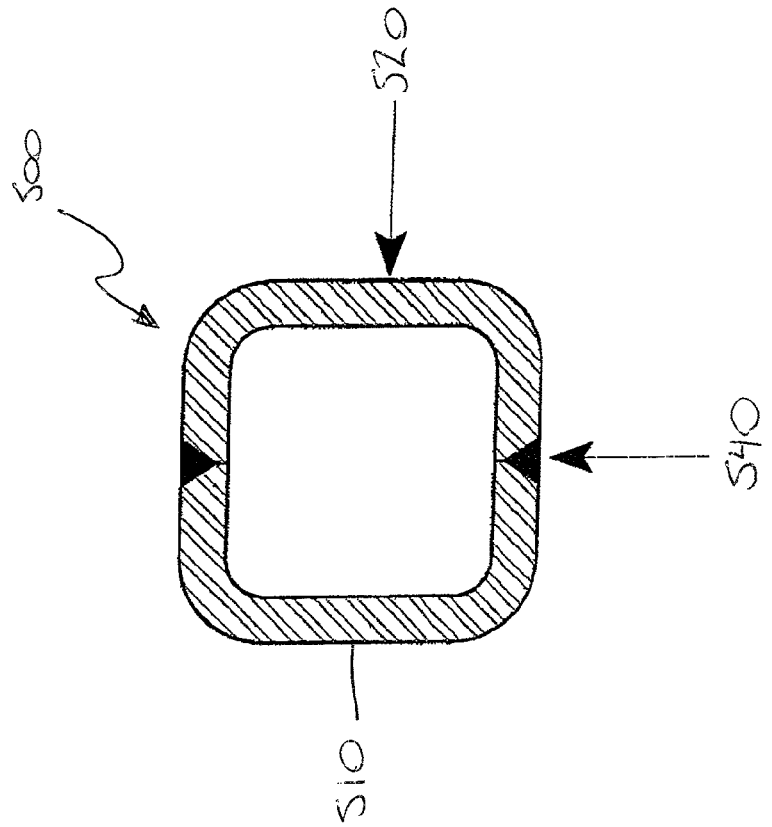
FIGS. 17A and 17B show side and cross-sectional views of a curved elbow of the present invention.
Figure 17A:
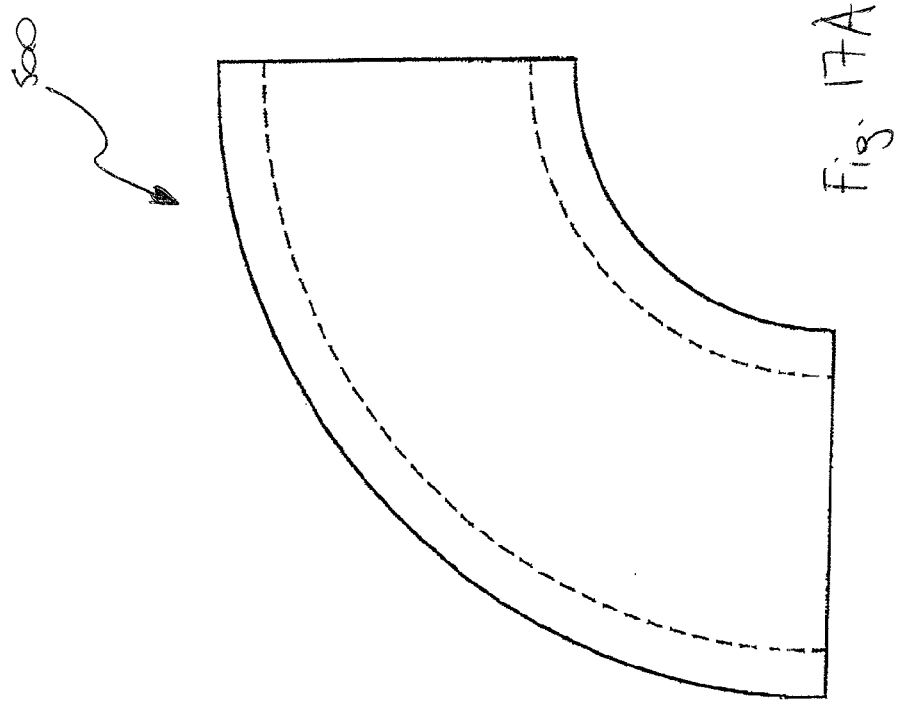

Referring to FIGS. 17A and 17B, the curved tubular member 500 is made from two members 510 and 520. The members 510 and 520 can be stamped or cut from flat metal plates and then rolled to provide the desired three-dimensional shape. The edges 540 of the members 510 and 520 are then welded together to form the curved tubular member 500. The welds between the edges 540 will generally be located on the inner and outer curved sides of the curved tubular member 500 because it is generally considered to be easier to manufacture the curved tubular member that way. However, it is entirely possible to manufacture the curved tubular member 500 such that the welds between the edges 540 are located on the lateral sides.

Referring to FIG. 10, a 2"×2"×3/16" 90-degree steel elbow 50 is shown butt-welded to adjacent sections of square tubing 60. The elbow 50 may be manufactured by casting, or by the methods illustrated in FIGS. 16A, 16B, 17A and 17B or a combination thereof. One butt-weld 52 is ground flush to the surface of the metal tube 60 and elbow 50 and the other butt-weld 54 is not. FIG. 10 illustrates the basis of the present invention; structures built from metal tubing wherein the curved joints or elbows are cast and welded to sections of metal tubing.

Referring to FIG. 11, a cab guard 70 for a truck is shown as an example of a structure built according to the present invention. Cab guards are designed to prevent objects on the bed or trailer of a truck from striking the cab of the truck. The cab guard 70 is constructed from 4" steel square tubing and a steel mesh screen 72. Straight sections of square tubing 74 are butt welded to 90-degree cast steel curved elbows 76.

According to the present invention, a metal tubular structure can be constructed by joining the ends of substantially straight sections of square metal tubes to the ends of curved tubular metal elbows. When made according to the present invention, such structures are easier to make (i.e. the structure is easier to assemble), less susceptible to lamellar tearing and other structural defects, less likely to result in deformations (e.g. bending or twisting of the sections of tubing), generally stronger and lighter, and more aesthetically pleasing than prior art metal tube structures.

In one specific embodiment the present invention involves welding together sections of metal tubing to form the desired structure wherein the curved sections are manufactured by means that do not involve bending of tubular metal members. The curved tubular sections or components are welded to the other sections of metal tubing in the structure according to known welding techniques.

The butt-welded joints of structures made according to the present invention can be easily conformed to the AWS standards on-site as they are being made, for example by ensuring that the welds between members are appropriately chamfered or beveled and/or by imparting the correct slope to the welds. Such conforming welds are prequalified by the AWS and therefore need not be inspected or approved by an engineer. Therefore, the present invention provides a substantial economic and practical benefit over prior art methods such as that disclosed by Kirschenmann et al.

Figure 18:
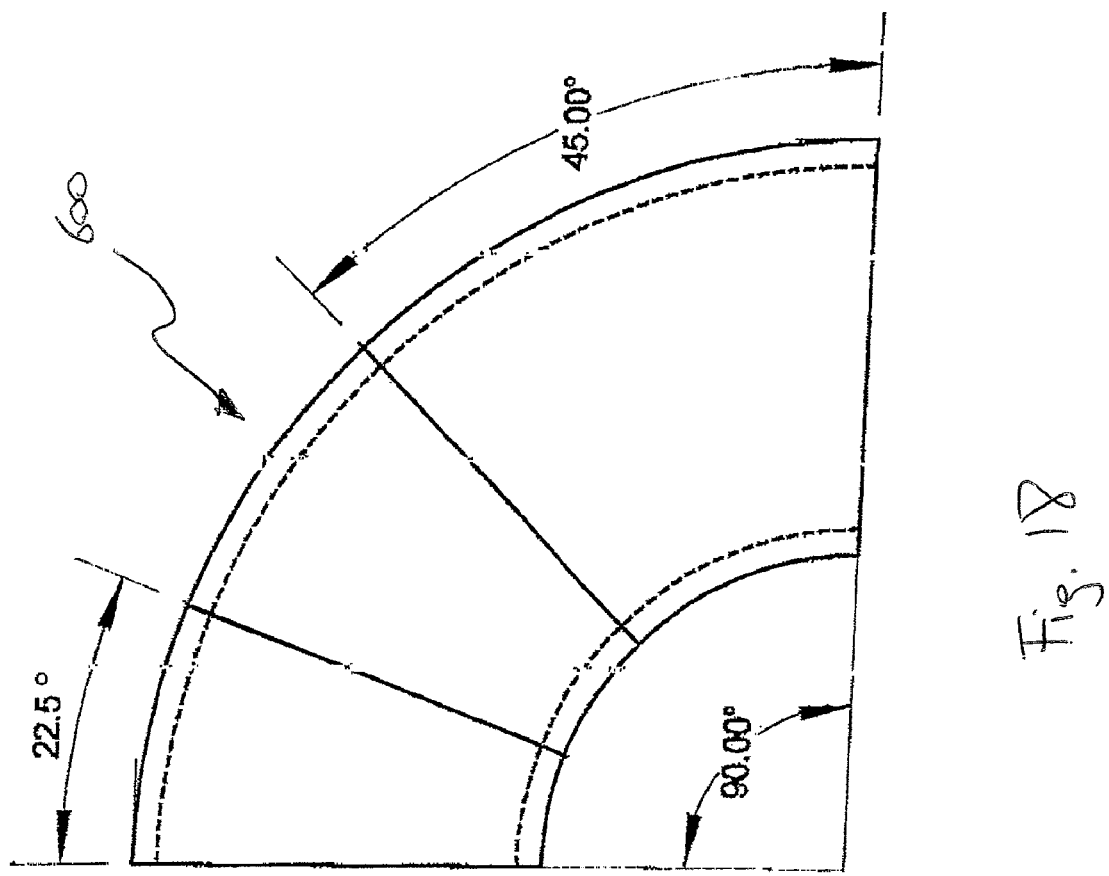
FIG. 18 shows a side view of a 90-degree elbow according to the present invention.

Referring to FIG. 18, a 90° curved square tubular elbow 600 of the present invention is shown. The tubular elbow 600 may be manufactured by any appropriate means other than bending of a metal tube. For example, the tubular elbow 600 may be made by casting, or by stamping, rolling and welding. The 90° curved tubular elbow 600 can be readily cut down to form a 45°, 22.5° or 67.5° curved member (or to form a curved member of any other desired angle), as shown in FIG. 18. The 90° curved tubular elbow 600 can also be cut down to any other desired angle. The cut or uncut elbow 600 can then be welded to other tubular members in the manner described above. In this way, the angle of curvature of the curved tubular members of the present invention can be readily adjusted or fine-tuned, without departing from the prequalified standards set by the AWS.

Figure 14:
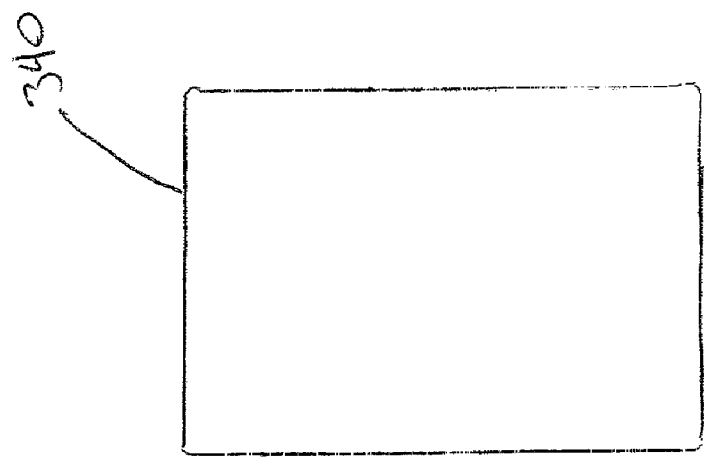
FIG. 14 is a second cross-sectional view of the corner of FIG. 12.
Figure 13:
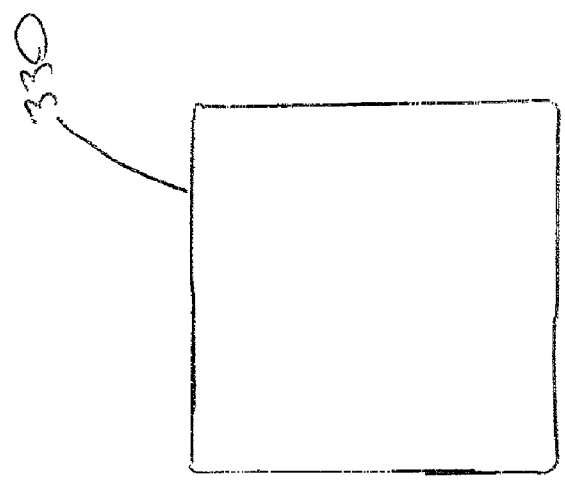
FIG. 13 is a first cross-sectional view of the corner of FIG. 12.
Figure 15:
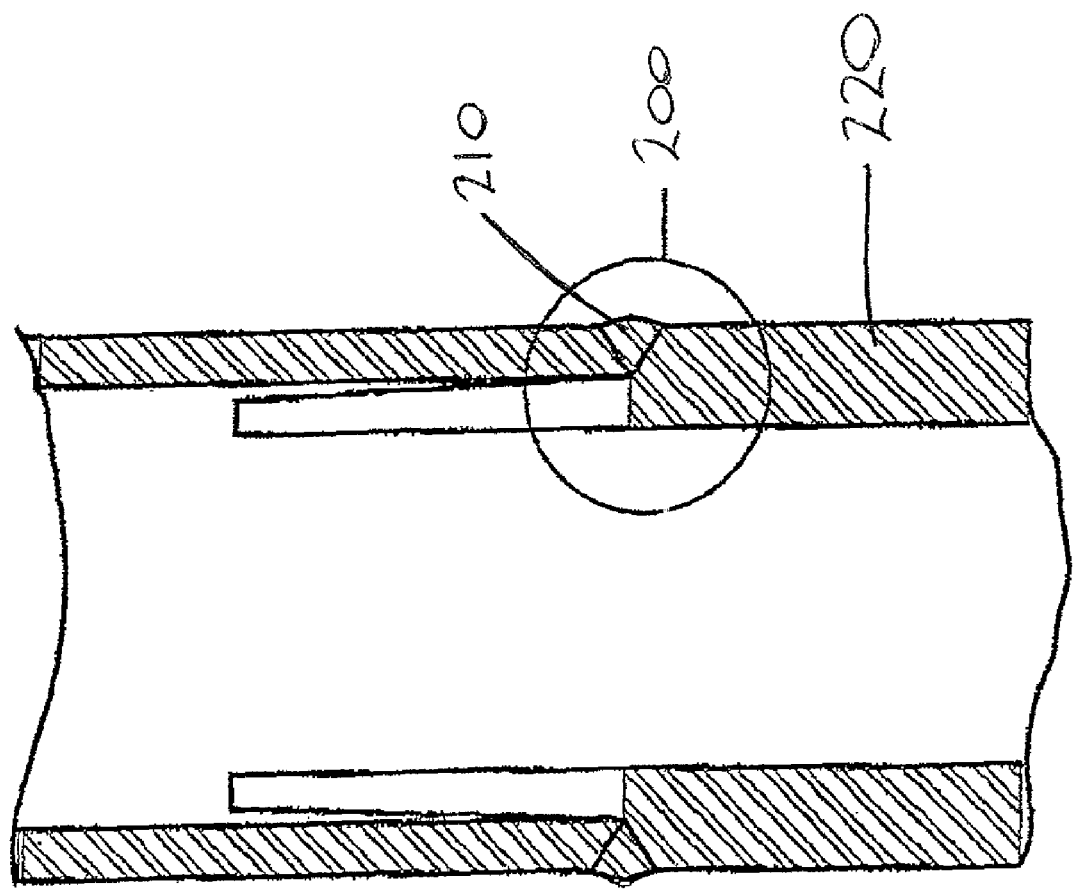
FIG. 15 is a sectional view of a prior art welded joint having gussets.

Referring again to FIGS. 12-14, prior art tubular structures suffer from the drawback that the cross-sectional shape of the corner member changes from one end of the corner member to the other (i.e. the cross-sectional shape is not constant). Therefore, if any adjustment is made to the corner member (e.g. cutting off an end portion to effectively change the angle of the corner member from 90° to 45°) then the cross-sectional shape of the terminal portion of the corner member will have been changed. Therefore, the cross-sectional shape of the terminal portion of the corner member will no longer line up or match up with the end of the structural member (e.g. a straight square tubular member) to which it is to be welded. Therefore, time- and material-consuming steps must be taken in order to join the corner member to the structural member, often resulting in a structurally and aesthetically compromised joint.

Referring to FIGS. 6-10 and 16-18, in contrast, in a preferred embodiment of the present invention the curved square tubular members of the present invention have substantially constant cross-sectional shape. Curved tubular members whose cross-sectional shape remains constant throughout can be cut at any point along a radius of the curve without changing the cross-sectional shape of the terminal portion exposed by the cut. Therefore, terminal portion exposed by such a cut can be readily butt welded to other square tubular members having a similar cross-sectional shape.

As used herein "butt weld" is used to refer to a weld in a butt joint. A butt joint refers to a joint between the ends of two members aligned approximately in the same plane. In applications where the structural integrity of the metal tube structure is of particular importance (e.g. ROPS and FOPS) the butt welds will generally be complete joint penetration welds (CJP welds).

The invention may be summarized at least in part by the following comprising at least two substantially straight sections of square metal tubing and at least one curved section of square metal tubing, wherein an end of a first one of said substantially straight sections is butt welded to a first end of said curved section and an end of a second one of said substantially straight sections is butt welded to a second end of said curved section, wherein said curved section is made by one of:

a) casting; and b) a combination of one or more of cutting, stamping, rolling and welding; and wherein said curved section is not made by bending a metal tube.

Statement 2. The invention includes the structure of Statement 1, wherein said structure is one of a handrail, a fence, a vehicle brush-guard, a rollover protection system and a falling object protection system.

Statement 3. The invention includes the structure of Statement 1, wherein said square metal tubing is made of one or more of: steel, stainless steel, iron, and aluminum.

Statement 4. The invention includes the structure of Statement 1, wherein said square metal tubing has a rectangular cross-section.

Statement 5. The invention includes the structure of Statement 1, wherein corner edges of said square metal tubing are rounded.

Statement 6. The invention includes the structure of Statement 1, wherein said square metal tubing is made by welding together two identical halves.

Statement 7. The invention includes the structure of Statement 1, wherein a cross-sectional shape of said curved section of square metal tubing is substantially constant.

Statement 8. A method of constructing a tubular metal structure, comprising the following steps: providing two substantially straight sections of square metal tubing; providing at least one section of curved square metal tubing, wherein said curved section is made by one of: casting; and a combination of one or more of cutting, stamping, rolling and welding; and wherein said curved section is not made by bending a metal tube; butt welding an end of one of said substantially straight sections of metal tubing to a first end of said section of cast curved metal tubing; and butt welding an end of a second one of said substantially straight sections of metal tubing to a second end of said section of cast curved metal tubing.

Statement 9. The invention includes the method of Statement 8, wherein said structure is one of a handrail, a fence, a vehicle brush-guard, a rollover protection system and a falling object protection system.

Statement 10. The invention includes the method of Statement 8, wherein said square metal tubing is made of one or more of: steel, stainless steel, iron, and aluminum.

Statement 11. The invention includes the method of Statement 8, wherein said square metal tubing has a rectangular cross-section.

Statement 12. The invention includes the method of Statement 8, wherein corner edges of said square metal tubing are rounded.

Statement 13. The invention includes the method of Statement 8, wherein said square metal tubing is made by welding together two identical halves.

Statement 14. The invention includes the method of Statement 8, wherein a cross-sectional shape of said curved section of square metal tubing is substantially constant.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What I am claiming is:

1. A curved tubular member that joins a first section of square metal tubing to a second section of square metal tubing, wherein said curved tubular member comprises:
   a. a curved outer side, wherein said curved outer side forms an outer radius of curvature of said curved tubular member;
   b. a curved inner side, wherein said curved inner side forms an inner radius of curvature of said curved tubular member,
   wherein said inner radius of curvature is less than said outer radius of curvature;
   c. a first lateral side;
   d. a second lateral side, wherein said second lateral side opposes said first lateral side,
   wherein said curved tubular member has a square cross-sectional shape when said curved tubular member is cut at any point along the outer and inner radii of curvature, and wherein said curved tubular member further comprises:
   e. a first end, wherein said first end connects to an end of the first section of square metal tubing; and,
   f. a second end, wherein said second end connects to an end of the second section of square tubing,
   whereby the first section of square metal tubing is joined to the second section of square metal tubing by said curve tubular member.

2. The curved tubular member of claim 1 wherein the curved tubular member is not produced by bending a metal tube.

3. The curved tubular member of claim 1 wherein the curved tubular member is made by casting.

4. The curved tubular member of claim 1 wherein the curved tubular member is made by at least one of stamping, rolling, and welding.

5. The curved tubular member of claim 1 wherein at least one of said curved outer side, said curved inner side, said first lateral side and said second lateral side is made by stamping or cutting a piece of flat metal.

6. The curved tubular member of claim 1 wherein at least one of said curved outer side and said curved inner side is made by i) cutting or stamping a piece of flat metal to produce a member; and ii) rolling the member to produce the outer or inner radii, respectively.

7. The curved tubular member of claim 1 wherein said curved tubular member is made by:
   (c) stamping or cutting a first member from a flat metal plate;
   (d) stamping or cutting a second member from a flat metal plate;
   (e) rolling the first and second members to form a desired three-dimensional shape; and,
   (f) welding the curved members of Step (e) together to form the curved tubular member.

8. The curved tubular member of claim 1 wherein the square cross-sectional shape is substantially constant throughout the curved tubular member.

9. A tubular metal structure comprising said curved tubular member of claim 1.

10. The tubular metal structure of claim 9 wherein said tubular metal structure is one of a handrail, a fence, a vehicle brush-guard, a vehicle rollover protection system, and a falling object protection system.

11. A method of using the curved tubular member of claim 1 to construct a tubular metal structure, said method comprising the steps of:
   (a) connecting the end of the first section of square metal tubing to said first end of said curved tubular member; and,
   (b) connecting the end of the second section of square metal tubing to said second end of said curved tubular member.

12. The method of claim 11 wherein at least one of Step (a) and Step (b) is performed by butt welding.

13. The method of claim 11 wherein said curved tubular member is produced without bending tubing.

14. The method of claim 11 wherein said curved tubular member is produced by casting.

15. The method of claim 11 further comprising the step of producing at least one of said first lateral side and said second lateral side by stamping or cutting a piece flat metal.

16. The method of claim 11 further comprising the step of producing at least one of said curved outer side and said curved-inner side by i) cutting or stamping a piece of flat metal to produce a member; and, ii) rolling the member to produce the outer or inner radii.

17. The method of claim 11 further comprising the steps of:
   (c) stamping or cutting a first member from a flat metal plate;
   (d) stamping or cutting a second member from a flat metal plate;
   (e) rolling the first and second members to form a desired three-dimensional shape; and,
   (f) welding together the first and second members of Step (e) to form the curved tubular member.

* * * * *